Aug. 20, 1968   H. V. HANSEN ET AL   3,397,658
TOOL BAR CARRIER FOR UNIT PLANTERS
Filed Nov. 1, 1965
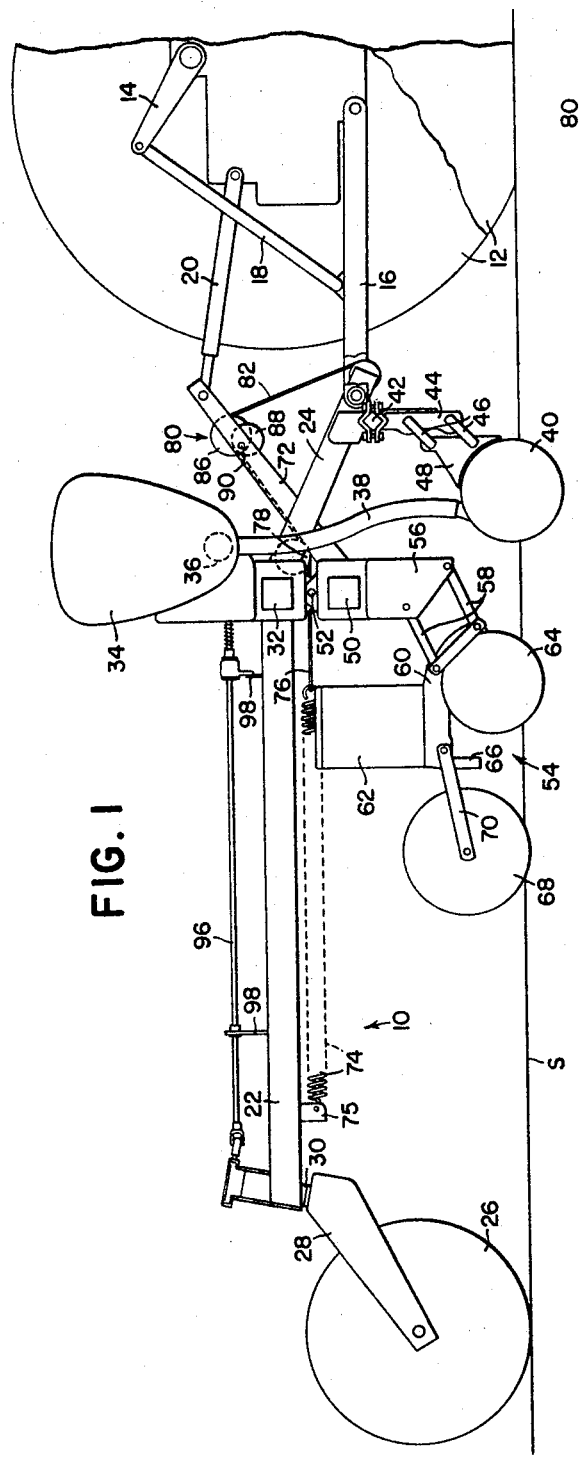
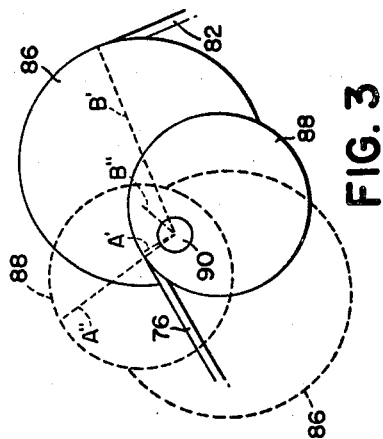
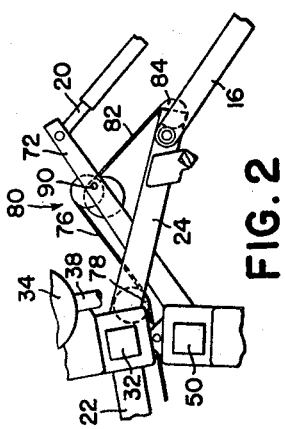
INVENTORS.
HAROLD V. HANSEN
ROGER W. CURRY
BY
John C. Thompson
ATTORNEY

United States Patent Office 3,397,658
Patented Aug. 20, 1968

3,397,658
TOOL BAR CARRIER FOR UNIT PLANTERS
Harold V. Hansen, Cordova, and Roger W. Curry, Port Byron, Ill., assignors to Deere & Company, Moline, Ill., a corporation of Delaware
Filed Nov. 1, 1965, Ser. No. 505,857
10 Claims. (Cl. 111—36)

ABSTRACT OF THE DISCLOSURE

A tool bar carrier in which part of the weight of the carrier is supported by the conventional three-point linkage system of a tractor and another portion of the weight is supported by ground-engaging means to the rear of the carrier, the tool bar carrier having a transversely extending rotatable tool bar. The tool bar and the carrier are independently connected with the draft links and the compression links of the tractor in such a manner that, as the tool carrier is raised, the tool bar is rotated relative to the frame of the carrier.

---

The present invention relates generally to agricultural implements and more particularly to tool bar carriers which are adatped to be secured to conventional farm tractors and to which unit planters or the like may be secured.

Tool bars are well known in the art and it has been the practice for some years to mount unit planters on tool bars. The tool bars that are known in the art today are generally mounted integrally on a tractor; that is, they are entirely supported by the tractor, generally by the conventional three-point linkage with which most tractors of today are equipped. However, in recent years, the horsepower of the tractors has been increasing at a rapid rate whereby today many of the larger tractors can propel more unit carriers than they can carry. Thus the typical 80–90 horsepower tractor of today is capable of only lifting four unit planters with fertilizer attachments mounted on an integral tool bar. If more than four unit carriers with fertilizer attachments were mounted on the tool bar, the tractor would not have sufficient stability or weight on its forward wheels to lift them. However, the tractor has sufficient power capabilities to pull six or more unit planters without any difficulty.

Therefore it is an object of the present invention to provide a tool bar carrier so designed and constructed that additional unit planters can be carried by a tool bar secured to a tractor. More specifically, it is an object of the present invention to provide a tool bar carrier in which part of the weight of the carrier is supported by the conventional three-point linkage system of a tractor and another portion of the weight is supported by ground-engaging means to the rear of the carrier.

A further object of the present invention is to provide a tool bar carrier having a tarnsversely extending rotatable tool bar and means which interconnect the carrier and the rotatable tool bar with the three-point linkage system of a tractor whereby when the tool carrier is raised, the tool bar is rotated relative to the frame of the carrier to provide additional ground clearance between the unit planters carried by the tool bar and the ground.

A further object of the present invention is to provide a unit carrier in which weight transfer means are provided whereby more weight is tarnsferred to the front wheels of the tractor when the carrier is in its raised transport position than when the carrier is in its lowered ground-working position.

A still further object of the present invention is to provide a tool bar carrier which is low in cost, of high durability, and well suited for its intended purpose.

These and other objects and advantages of this invention will be apparent to those skilled in the art after a consideration of the following detailed description, taken in conjunction with the accompanying drawings in which the preferred form of this invention is illustrated.

FIG. 1 shows the carrier of this invention secured to the draft links and compression link of a conventional farm tractor, the carrier being shown in its normal working position.

FIG. 2 is a fragmentary side view showing a portion of the carrier secured to a tractor three-point hitch when the carrier is in its raised transport position.

FIG. 3 is an enlarged view of a portion of the rotatable weight-transferring structure, the full lines showing its working position and the broken lines its transport position.

The tool carrier of this invention, which is indicated generally at 10, is adapted to be secured to the three-point hitch of a conventional farm tractor having front wheels (not shown) and spaced apart rear wheels 12. The three-point hitch of the tractor includes a pair of rock arms 14 (only one of which is shown) which are interconnected with a pair of vertically swingable draft links 16 by means of a pair of lift links 18; the three-point hitch also including an upper compression link 20. The carrier 10 includes a longitudinally extending main frame 22 which carries at its forward end forwardly and downwardly extending rigid connection means 24 which are adapted to be pivotally interconnected with the lower draft link 16 of a tractor in any conventional manner. The rear of the frame 22 is supported by ground-engaging wheel means 26 which is rotatably supported by a caster arm housing 28 which carries at its upper end an apertured sleeve 30 which is rotatably journaled within an end of the frame 22.

The forward end of the frame 22 carries a rigid transversely extending tool bar 32 to which a plurality of fertilizer hoppers 34 may be secured. Each hopper is provided with an auger 36 in its bottom which is in communication with a discharge tube 38 through which fertilizer material may be discharged to a disk opener 40. The disk opener is carried by a tool bar 42 that is secured to the forwardly and downwardly extending rigid connection links 24, the bar 42 in turn carrying a lower depending mounting structure 44 to which a pair of parallel links 46 are secured, the rear end of the links 46 carrying a disk support member 48. Swingably secured to the tool bar 32 is a lower tool bar 50 which is connected to the upper tool bar 32 by means of a pivotal connection 52. As can be seen from a comparison of FIGS. 1 and 2, the lower tool bar is rotatable with respect to the upper tool bar 32 and frame 22.

While any structure may be carried by the tool bar 50, the structure of this invention finds particular application when unit planters, indicated generally at 54, are secured to the tool bar. Each tool bar is provided with a forward mounting structure 56 which is secured to the tool bar 50, rearwardly extending parallel links 58, a planter housing and boot 60 which is secured to the rearward ends of the parallel links 58, the member 60 in turn carrying a hopper 62 and opener means 64, the hopper being provided with a discharge tube 66. As is conventional, the unit planter is driven from a press wheel 68 through pivoted drive housing 70.

It is a principal feature of this invention to provide means for rotating the tool bar 50 with respect to the tool bar 32 and carrier frame 22 when the forward end of the implement carrier is raised through the lower draft links of the tractor to provide additional clearance between the press wheel 68 and the surface of the ground as when the unit planters are in their transport position. To this end an upwardly and forwardly extending rigid connection link 72 is provided which is secured at its rear end to the rotatable tool bar 50, the upper forward end of the link 72 being secured to a relatively fixed portion of the tractor, which preferably is the upper compression link 20 of the tractor. Thus when the forward end of the carrier 10 is raised by raising the rearward end of the draft links 16, the distance between the end of the draft links 16 and the end of the upper compression link 20 lessens, as can be seen from a comparison of FIGS. 1 and 2, and this moving together of the forward ends of the connection links 24 and 72 causes the tool bar 50 to rotate relative to the frame 22.

To provide additional weight transfer to the forward wheels of the tractor, a spring assembly is provided which includes a longitudinally extending spring 74 which is secured at its rear end to a bracket 75 fixed to the frame 22. The forward end of the spring 74 is secured to a cable 76 which is trained over a sheave 78 and extends upwardly to a rotatable structure, indicated generally at 80, carried by the upper forward end of the connection link 72. A second cable 82 extends from the structure 80 to connection means 84 fixed adjacent the rear end of the draft links 16. The spring 74 is normally held under tension and exerts a lifting force through cable 82 to cause the weight to be transferred to the forward wheels of the tractor.

To increase the transfer of weight in the transport position when greater tractor stability is needed, the rotatable structure 80 has a special configuration. Thus the structure 80 has a first sheave 86 (FIG. 3) and a second sheave 88 of slightly smaller diameter, the two sheaves being fixed eccentrically to each other. A pivot pin 90 is secured to the link 72 and the sheaves 86, 88 are in turn rotatably carried by the pin, the pin being eccentric to each of the sheaves. In the working position, the cable 76 will exert a force on the sheaves tending to rotate them in a counterclockwise direction, the force being transmitted about the pivot pin 90 by the moment arm A'. This will in turn exert a lifting force through the cable 82 through a moment arm B'. Thus in the planting position the force which is exerted through the arms A' and B' will be reduced by the value of A'/B'. In the transport position the cable 76 exerts a turning force about an arm A" and the lifting force is exerted through an arm B" which is of considerably less length than the arm A". Thus in the transport position the force is increased by the rate of A"/B". Even if the spring loses one-half of its force during the raising of the tool bar a greater lifting force will be transferred to the front wheels of the tractor when the carrier is in its transport position than when it is in its planting position.

To drive the auger 36 in the fertilizer hopper 34, drve means are provded which include the gear case 28 which has a drive chain (not shown) driven by a sprocket carried by the hub which in turn carries the wheel 26, the chain in turn driving drive means extending through the rotatable spindle which in turn drives the shaft 96 supported on brackets 98 and through additional conventional drive elements that drive the auger 36.

While the preferred structure in which the principles of the present invention have been incorporated is shown and described above, it is to be understood that the invention is not to be limited to the particular details, shown and described above, but that, in fact, widely different means may be employed in the practice of the broader aspects of the invention.

What is claimed is:

1. An implement carrier adapted to be propelled by a tractor having front and rear wheels, vertically movable draft links, and an upper compression link, said carrier comprising: a frame; a transverse tool bar rotatably carried on said frame; ground-engaging means supporting the frame to the rear of the tool bar; first connection means on the frame extending forwardly of the tool bar and connectible with the tractor draft links; and second connection means operable to interconnect the tool bar with a portion of the tractor above the tractor draft links and operable to cause the tool bar to rotate relative to the main frame when the first and second connection means are secured to the tractor and the tractor draft links are moved relative to said portion of the tractor.

2. The carrier set forth in claim 1 in which said portion of the tractor is the compression link of the tractor.

3. The carrier set forth in claim 1 in which said first and second connection means are rigid links.

4. The carrier set forth in claim 1 in which weight transfer means is provided on the carrier for transferring weight to the front wheels of the tractor.

5. The carrier set forth in claim 4 in which the weight transfer means includes a resiliently extensible means having its rear end fixedly secured to the frame, first force transmitting means extending between the forward end of the resiliently extensible means and structure mounted on said second connection means, and second force transmitting means adapted to interconnect said structure with the draft links of the tractor.

6. The carrier set forth in claim 1 in which weight transfer means is provided on the carrier for transferring more weight to the front wheels of the tractor when the draft links are in their upper transport position than when the draft links are in their lower transport position, said weight transfer means including a spring having its rear end fixedly secured to the frame, a sheave assembly including a first sheave, a second sheave eccentrically fixed to said first sheave, and pivot means eccentric to both sheaves and rotatably mounting said assembly on said second connection means, first cable means extending between the forward end of the spring and the first sheave, and second cable means secured at one end with said second sheave and adapted to interconnect said second sheave with the draft links of the tractor.

7. The carrier set forth in claim 1 in which the ground engaging means comprises caster wheel means.

8. The carrier set forth in claim 1 further characterized by the provision of a second transversely extending tool bar fixed to said frame, said second tool bar having fertilizer distributing means mounted thereon.

9. The carrier set forth in claim 8 in which ground engaging wheel means are provided with means for driving said fertilizer distributing means.

10. The carrier set forth in claim 8 in which said first tool bar is disposed below said second tool bar and rotatably carried thereby.

References Cited
UNITED STATES PATENTS

| | | | |
|---|---|---|---|
| 2,247,534 | 7/1941 | Von Schlegell | 172—7 |
| 2,685,242 | 8/1954 | Rusco | 111—54 XR |
| 2,739,549 | 3/1956 | Taylor | 111—9 |
| 3,057,414 | 10/1962 | Ralston | 172—444 |
| 3,233,682 | 2/1966 | Thompson | 172—7 |

ABRAHAM G. STONE, *Primary Examiner.*

R. C. HARRINGTON, *Assistant Examiner.*